United States Patent [19]

Katou et al.

[11] Patent Number: 4,476,067
[45] Date of Patent: Oct. 9, 1984

[54] DEVICE FOR CONTROLLING THE OPERATION OF A CARBURETOR

[75] Inventors: Takashi Katou, Mishima; Masaharu Hayakawa, Nagoya; Hidenori Hirosawa, Aichi, all of Japan

[73] Assignees: Toyota Jidosha Kabushiki Kaisha, Toyota; Aisan Industry Co., Ltd., Obu, both of Japan

[21] Appl. No.: 427,294

[22] Filed: Sep. 29, 1982

[30] Foreign Application Priority Data

Jan. 22, 1982 [JP] Japan ................................ 57-007414

[51] Int. Cl.³ .............................................. F02M 9/06
[52] U.S. Cl. ................................. 261/39 A; 261/44 C; 261/121 B; 60/527; 236/99 D; 236/100; 236/101 C
[58] Field of Search ............... 261/39 A, 44 C, 121 B; 60/527; 236/99 D, 100, 101 C

[56] References Cited

U.S. PATENT DOCUMENTS

| | | | |
|---|---|---|---|
| 3,019,986 | 2/1962 | Schoerner | 236/93 A |
| 3,131,563 | 5/1964 | Britton | 60/527 |
| 3,291,054 | 12/1966 | McKenzie | 60/527 |
| 3,330,480 | 7/1967 | Drapeau et al. | 261/39 A |
| 3,756,083 | 9/1973 | Tatsutomi et al. | 60/527 |
| 4,128,203 | 12/1978 | Maltby | 236/100 |
| 4,175,697 | 11/1979 | Dreibelbis | 236/100 |
| 4,351,782 | 9/1982 | Bellicardi et al. | 261/39 A |
| 4,393,012 | 7/1983 | Kato et al. | 261/39 A |

Primary Examiner—Tim R. Miles
Attorney, Agent, or Firm—Finnegan, Henderson, Farabow, Garrett & Dunner

[57] ABSTRACT

A device for controlling the operation of a carburetor comprising a wax valve fitted into a bore formed in the device housing. A wax valve holder is fitted into the bore so as to surround the temperature sensitive portion of the wax valve. A cooling water passage is formed in the bore so as to surround the wax valve holder. A heat insulating space is formed between the outer wall of the temperature sensitive portion and the inner wall of the wax valve holder.

20 Claims, 7 Drawing Figures

DEVICE FOR CONTROLLING THE OPERATION OF A CARBURETOR

BACKGROUND OF THE INVENTION

The present invention relates to a device for controlling the operation of a carburetor.

In a conventional engine, the increase in the temperature of the engine cooling water corresponds to the progress in engine warm-up. Consequently, in the majority of conventional engines, engine operation is controlled during engine warm-up in accordance with the change in the temperature of the engine cooling water. For example, a carburetor control device has been known in which the fast idle cam of the carburetor is actuated by a wax valve which is operated in response to the change in the temperature of the engine cooling water.

The reason why the engine cooling water is used for controlling engine operation during engine warm-up in the majority of conventional engines is that the engine cooling water is easier to handle than engine lubricating oil and electrical control devices and the construction of the engine control device can be simplified.

Newer engines, however, are being designed for reduced weight, one method of reducing weight being to reduce the amount of cooling water as much as possible. In such newer engines, the cooling water temperature increases faster during engine warm-up than in conventional engines. Thus, the increase in the cooling water temperature no longer corresponds to the progress of engine warm-up. If such a newer engine is equipped with a conventional carburetor designed so that the fast idle cam thereof is actuated in response to the change in the cooling water temperature, the fast idle cam will become disengaged from the throttle valve of the carburetor before the completion of engine warm-up. The engine speed will therefore drop and the engine will stop.

SUMMARY OF THE INVENTION

An object of the present invention is to provide a carburetor control device capable of suitably controlling engine operation in accordance with the progress of engine warm-up on the basis of the cooling water temperature even though the cooling water temperature increases faster than in conventional engines.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein there is provided in one aspect of the invention a device for controlling the operation of a carburetor, comprising: a housing having an axially extending bore therein; a wax valve fitted into said bore and extending in the axial direction of said bore, said wax valve having a temperature sensitive portion at one end thereof and having a central flange portion which has an outer diameter larger than that of said temperature sensitive portion; a cup-shaped wax valve holder fitted into said bore so as to surround said temperature sensitive portion, said wax valve holder being spaced from said temperature sensitive portion for forming a heat insulating space therebetween; and having a thickened portion at one end thereof which is located adjacent to the flange portion of said wax valve, said thickened portion having an outer diameter which is slightly smaller than the inner diameter of said bore, said thickened portion having an outer circumferential wall which is spaced from an inner circumferential wall of said bore, and a seal ring inserted between the outer circumferential wall of said thickened portion and the inner circumferential wall of said bore; and a cooling water passage formed in said bore and surrounding said wax valve holder.

The present invention may be more fully understood from the description of preferred embodiments of the invention set forth below, together with the accompanying drawings.

DESCRIPTION OF PREFERRED EMBODIMENTS

Reference will now be made in detail to the preferred embodiments of the invention, examples of which are illustrated in the accompanying drawings.

Figure 1:
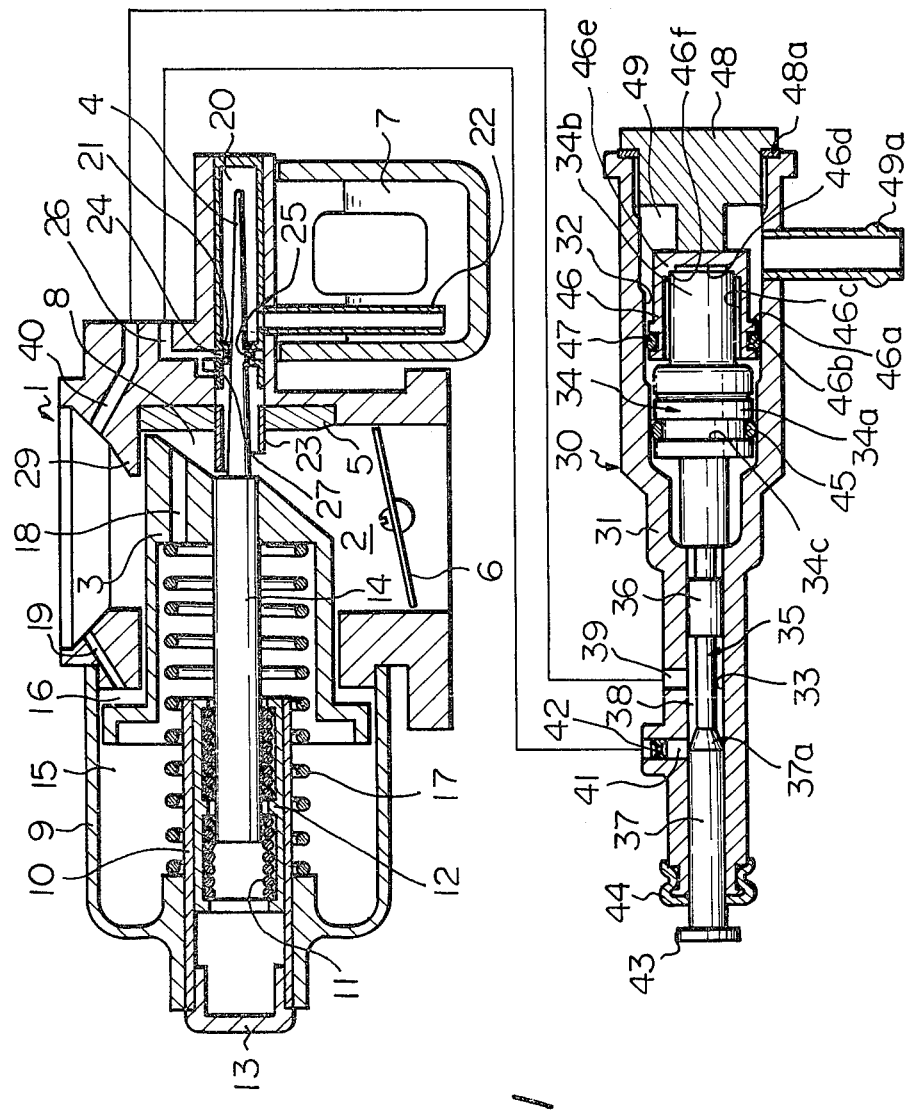
FIG. 1 is a cross-sectional side view of a carburetor and a preferred embodiment of a control device constructed according to the present invention.

Referring to FIG. 1, reference numeral 1 designates a carburetor body, 2 a vertically-extending intake passage, 3 a suction piston transversely movable in the intake passage 2, and 4 a needle fixed onto the tip face of the suction piston 3. Numeral 5 designates a spacer fixed onto the inner wall of the intake passage 2 and arranged to face the tip face of the suction piston 3, 6 a throttle valve arranged in the intake passage 2 located downstream of the suction piston 3, and 7 a float chamber of the carburetor. A venturi portion 8 is formed between the spacer 5 and the tip face of the suction piston 3. A hollow cylindrical casing 9 is fixed onto the carburetor body 1. A guide sleeve 10, extending within the casing 9 in the axial direction thereof is attached to the casing 9. A bearing 12, equipped with a plurality of balls 11, is inserted into the guide sleeve 10, and the outer end of the guide sleeve 10 is closed with a blind cap 13. A guide rod 14 is fixed onto the suction piston 3 and is inserted into the bearing 12 so as to be movable in its axial direction. Since the suction piston 3 is supported by the casing 9 via the bearing 12 as mentioned above, the suction piston 3 is able to smoothly move in the axial direction thereof.

The interior of the casing 9 is divided into a vacuum chamber 15 and an atmospheric pressure chamber 16 by the suction piston 3. A compression spring 17 for continuously biasing the suction piston 3 toward the venturi portion 8 is inserted into the vacuum chamber 15. The vacuum chamber 15 is connected to the venturi portion 8 via a suction hole 18 formed in the suction piston 3, and the atmospheric pressure chamber 16 is connected to the intake passage 2 located upstream of the suction piston 3 via an air hole 19 formed in the carburetor body 1.

A fuel passage 20 is formed in the carburetor body 1 and extends in the axial direction of the needle 4 so that the needle 4 can enter into the fuel passage 20. A metering jet 21 is arranged in the fuel passage 20. The fuel passage 20, located upstream of the metering jet 21, is connected to the float chamber 7 via a downwardly-extending fuel pipe 22. Fuel in the float chamber 7 is fed into the fuel passage 20 via the fuel pipe 22. In addition, a hollow cylindrical nozzle 23, arranged coaxially to the fuel passage 20, is fixed onto the spacer 5. The nozzle 23 projects from the inner wall of the spacer 5 into the venturi portion 8 and, in addition, the upper half of the tip portion of the nozzle 23 projects from the lower half of the tip portion of the nozzle 23 toward the suction piston 3. The needle 4 extends through the interior of the nozzle 23 and the metering jet 21. Fuel is fed into the intake passage 2 from the nozzle 23 after it is metered by an annular gap formed between the needle 4 and the metering jet 21.

An annular air passage 24 is formed around the metering jet 21. A plurality of air bleed bores 25 interconnecting the annular air passage 24 to the interior of the metering jet 21 is formed in the inner peripheral wall of the metering jet 21. The annular air passage 24 is connected to an air bleed passage 26 formed in the carburetor body 1. In addition, an auxiliary air bleed bore 27 is formed on the upper wall of the fuel passage 20 located downstream of the metering jet 21. The auxiliary air bleed bore 27 is connected to the air bleed passage 26.

A raised wall 29, projecting horizontally into the intake passage 2, is formed at the upper end of the spacer 5. Flow control is effected between the raised wall 29 and the tip end portion of the suction piston 3. When the engine is started, air flows downward within the intake passage 2. At this time, since the air flow is restricted between the suction piston 3 and the raised wall 29, a vacuum is created in the venturi 8. This vacuum acts on the vacuum chamber 15 via the suction hole 18. The suction piston 3 moves so that the pressure difference between the vacuum in the vacuum chamber 15 and the pressure in the atmospheric pressure chamber 16 becomes approximately equal to a fixed value determined by the spring force of the compression spring 17, that is, the level of the vacuum created in the venturi portion 8 remains approximately constant.

A carburetor control device 30 is attached to the carburetor body 1. An increased diameter bore 32 and a reduced diameter bore 33 which are interconnected to each other are formed in a housing 31 of the carburetor control device 30. A wax valve 34 is inserted into the increased diameter bore 32, and a push rod 35 actuated by the wax valve 34 is inserted into the reduced diameter bore 33. The push rod 35 has a pair of spaced enlarged portions 36, 37. An interior chamber 38 formed between the enlarged portions 36 and 37 is connected to the intake passage 2 located upstream of the raised wall 29 via an air bleed bore 39 formed in the housing 31 of the carburetor control device 30 and via an air bleed bore 40 formed in the carburetor body 1. The enlarged portion 37 has a frustum-shaped inner end 37a. An air bleed bore 41, the opening area of which is controlled by the inner end 37a of the enlarged portion 37, is formed in the housing 31 of the carburetor control device 30. An air bleed jet 42 is inserted into the air bleed bore 41, and the air bleed bore 41 is connected to the air bleed passage 26 formed in the carburetor body 1. The outer end of the enlarged portion 37 projects outwardly from the housing 31, and a disc-shaped head 43 is formed in one piece on the tip of the enlarged portion 37. In addition, the projecting outer end of the enlarged portion 37 is surrounded by a seal member 44 mounted on the housing 31.

The wax valve 34, fitted into the increased diameter bore 32 of the carburetor control device 30, comprises a flange portion 34a formed at the central portion thereof, and a temperature sensitive portion 34b having an outer diameter which is smaller than that of the flange portion 34a. The flange portion 34a has an outer diameter which is smaller than the inner diameter of the increased diameter bore 32. An annular groove 34c, extending along the entire outer circumferential wall of the flange portion 34a, is formed on the outer circumferential wall thereof, and an O ring 45 is fitted into the annular groove 34c. A cup-shaped wax valve holder 46 is fitted into the increased diameter bore 32 of the carburetor control device 30 so as to receive and surround the temperature sensitive portion 34b of the wax valve 34.

The wax valve holder 46 has a thick portion 46a at one end thereof, and an O ring 47 is fitted into an annular groove 46b formed on the outer circumferential wall of the thick portion 46a. As will be understood from FIG. 1, the thick portion 46a has an outer diameter which is slightly smaller than the inner diameter of the increased diameter bore 32 located around the thick portion 46a and, therefore, the thick portion 46a does not directly contact the inner wall of the increased diameter bore 32. In addition, the inner circumferential wall 46c of the wax valve holder 46 has an inner diameter which is slightly larger than the outer diameter of the temperature sensitive portion 34b, and an annular projection 46e is formed at the connecting portion of the inner circumferential wall 46c and the inner end wall 46d of the wax valve holder 46. An annular groove 46f, which receives the peripheral edge of the tip of the temperature sensitive portion 34b, is formed on the tip of the annular projection 46e, and the wax valve holder 46 contacts the temperature sensitive portion 34b only in the annular groove 46f.

A plug 48 is screwed into the increased diameter bore 32 and fixed onto the housing 31 via a gasket 48a and abuts the end wall of the wax valve holder 46 as shown; and, thus, the wax valve 34 is fixed into the housing 31 by means of the plug 48 via the wax valve holder 46. A cooling water chamber 49 is formed between the wax valve holder 46 and the plug 48, and a cooling water feed pipe 49a is connected to the cooling water chamber 49. Cooling water of the engine, fed into the cooling water chamber 49 via the cooling water feed pipe 49a, is discharged from a cooling water discharge hole 49b (FIG. 2) after the cooling water heats the wax valve 34 via the wax valve holder 46.

Referring to FIGS. 2 through 5, a bolt 50, functioning as a pivot, is secured onto the housing 32. A cam 51 and a lever 52 are rotatably mounted on the bolt 50. The lever 52 comprises an L-shaped member 52b spaced from an intermediate portion 52a of the lever 52. The intermediate portion 52a and the L-shaped member 52b are interconnected with each other by means of a U-shaped member 52c. A pin 53, extending through the intermediate portion 52a and the L-shaped member 52b, is fixed onto them, and a roller 54 is rotatably mounted on the pin 53. A tension spring 56 is arranged between a tip 52d of the lever 52 and a pin 55 fixed onto the housing 32 so that the roller 54 is continuously pressed in contact with the disc-shaped head 43 of the push rod 35 due to the spring force of the tension spring 56.

Figure 2:
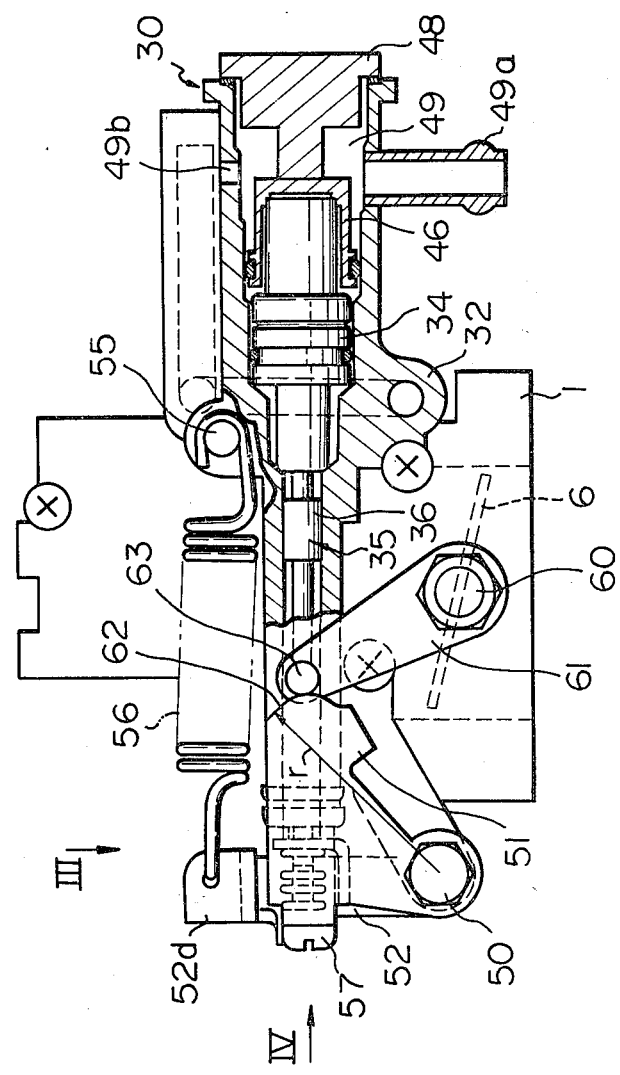
FIG. 2 is a side view, partly in cross-section, of the carburetor control device of FIG. 1.
Figure 3:
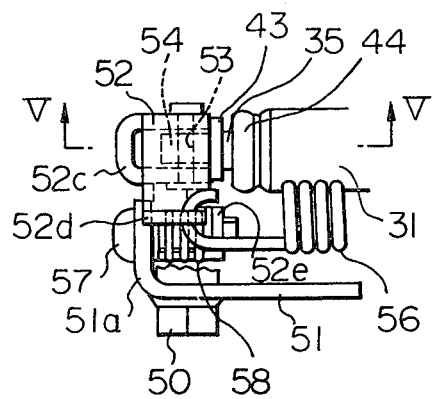
FIG. 3 is a plan view taken along the arrow III in FIG. 2.
Figure 4:
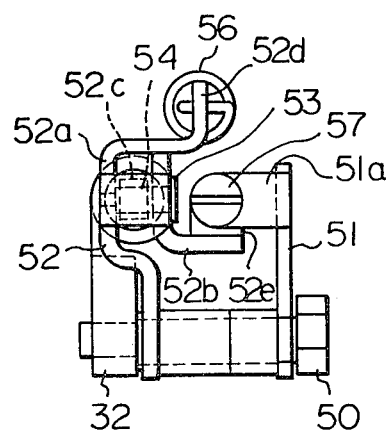
FIG. 4 is a side view taken along the arrow IV in FIG. 2.
Figure 5:
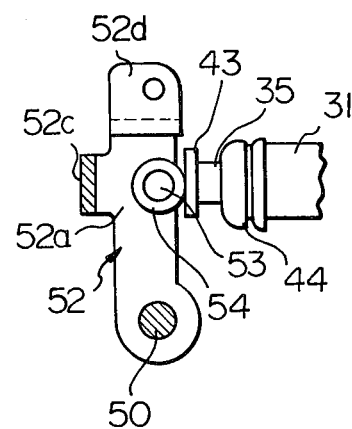
FIG. 5 is a cross-sectional view taken along the line V—V in FIG. 3.

An arm 52e is formed in one piece on the tip of the L-shaped member 52b of the lever 52. In addition, an arm 51a, facing the arm 52e, is formed in one piece on the end portion of the cam 51. An adjusting screw 57 is inserted into a bore (not shown) formed in the arm 51a of the cam 51, and the tip of the adjusting screw 57 is screwed into the arm 52e of the lever 52. Consequently, it is possible to adjust the relative position between the lever 52 and the cam 51 by rotating the adjusting screw 57. A compression spring 58, which serves to prevent the adjusting screw 57 from being loosened, is inserted between the arms 51a and 52e. The rotating force of the lever 52 is transferred to the cam 51 via the adjusting screw 37. When the lever 52 is rotated in the clockwise direction in FIG. 2, the cam 51 is accordingly rotated in the clockwise direction. On the other hand, as illustrated in FIG. 2, a lever 61 is fixed onto a valve shaft 60 of the throttle valve 6, and a pin 63, which is engageable with a cam face 62 of the cam 51, is fixed onto the tip of the lever 61. As will be understood from FIG. 2, the radius r of the cam face 62, which is measured from the bolt 50, is gradually reduced toward the clockwise direction.

FIG. 2 illustrates the case where the engine temperature is low. At this time, the throttle valve 6 remains open by means of the cam 51. When the engine is started and the temperature of the cooling water of the engine is increased, the push rod 35 moves toward the left in FIG. 2 under the operation of the wax valve 34. As a result, since the lever 52 is rotated in the counterclockwise direction in FIG. 2, the cam 51 is also rotated in the counterclockwise direction and, thus, the throttle valve 6 is gradually closed. As mentioned above, since the roller 54 is provided between the lever 52 and the disc-shaped head 43 of the push rod 35, the lever 52 is smoothly rotated when the push rod 35 moves toward the left in FIG. 2. After this, when the engine warm-up is completed, the cam 51 is disengaged from the pin 63 of the lever 61 and, thus, the throttle valve 6 is closed to its idling position.

As mentioned above, when the engine is started and the temperature of the cooling water of the engine increases, the push rod 35 moves toward the left in FIG. 2. As a result of this, in FIG. 1, since the amount of air fed into the interior chamber 38 via the air bleed bores 40, 39 is increased, the amount of air fed into the air bleed passage 26 from the interior chamber 38 via the air bleed bore 41 is increased. Consequently, since the amount of air fed into the fuel passage 20 from the air bleed bores 25, 27 is increased, the amount of fuel fed into the intake passage 2 from the nozzle 23 is gradually reduced and, thus, the air-fuel ratio of fuel mixture fed into the cylinder of the engine is gradually increased.

Returning to FIG. 1, the wax valve holder 46 directly contacts the cooling water of the engine, while the wax valve holder 46 contacts the temperature sensitive portion 34b only in the annular groove 46f. Consequently, when the temperature of the cooling water of the engine increases, the temperature of the wax valve holder 46 increases relatively fast, while the temperature of the temperature sensitive portion 34b increases relatively slow. In addition, as will be understood from FIG. 1, since a gap exists between the inner circumferential wall of the increased diameter bore 32 and the outer circumferential wall of the flange portion 34a of the wax valve holder 34, heat is not easily transferred to the wax valve 34 from the housing 31. Consequently, even if the temperature of the cooling water of the engine increases quickly, since the temperature of the temperature sensitive portion 34b increases slowly, the push rod 35 slowly moves toward the left in FIG. 2. As a result of this, the throttle valve 6 is gradually closed and, at the same time, the amount of fuel fed into the intake passage 2 from the nozzle 23 is gradually reduced in correspondence with the progress of engine warm-up. In addition, as illustrated in FIG. 1, an O ring 47 is inserted between the wax valve holder 46 and the inner circumferential wall of the increased diameter bore 32, and an O ring 45 is inserted between the wax valve 34 and the inner circumferential wall of the increased diameter bore 32. Consequently, even if the pressure of the cooling water of the engine is increased due to the occurrence of, for example, engine overheating, these O ring seals prevent the cooling water in the cooling water chamber 49 from leaking into the reduced diameter bore 33.

Figure 6:
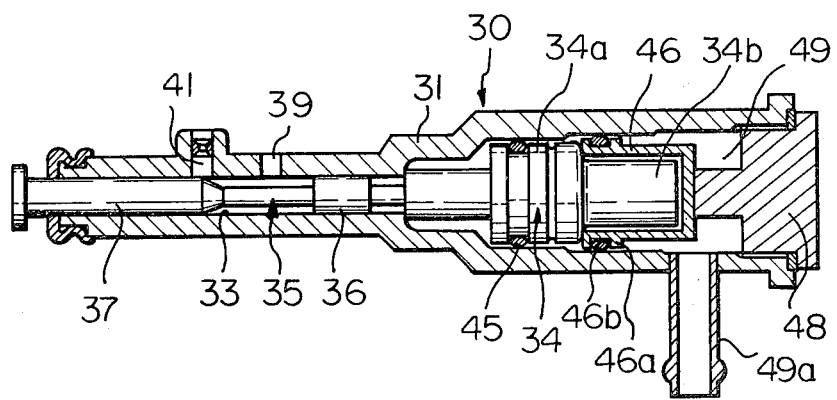
FIG. 6 is a cross-sectional side view of another embodiment of the carburetor control device constructed according to the present invention.

FIG. 6 illustrates another embodiment of the carburetor control device 30. In this embodiment, the tip face of the wax valve holder 46 is in contact with the flange portion 34a of the wax valve 34, and the wax valve holder 46 is not in contact with the temperature sensitive portion 34b. Consequently, in this embodiment, since the heat of the wax valve holder 46 is transferred to the temperature sensitive portion 34b via the flange portion 34a, the temperature of the temperature sensitive portion 34b slowly increases even if the temperature of the cooling water of the engine increases quickly.

Figure 7:
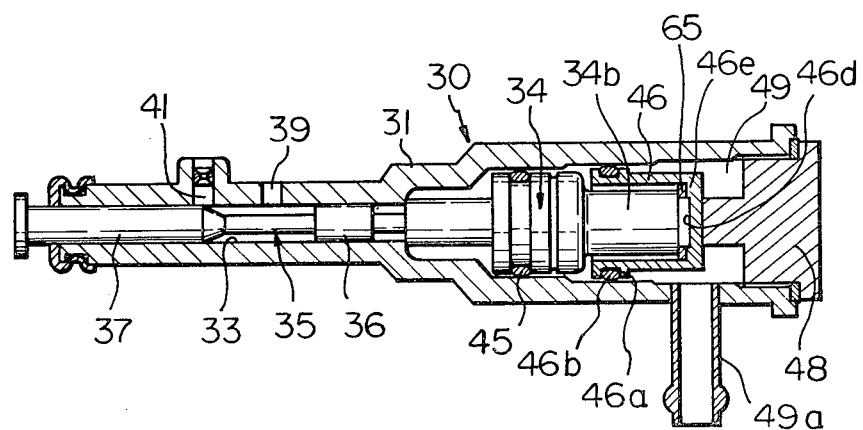
FIG. 7 is a cross-sectional side view of a further embodiment of the carburetor control device constructed according to the present invention.

FIG. 7 illustrates a further embodiment of the carburetor control device 30. In this embodiment, a spacer 65, made of low thermal conductivity material such as stainless steel, invar, or asbestos, is inserted between the end face of the temperature sensitive portion 34b and the annular projection 46e formed on the periphery of the inner end face 46d of the wax valve holder 46 so that the wax valve holder 46 is connected to the temperature sensitive portion 34b only via the spacer 65. In this embodiment, there is an advantage in that it is possible to change the speed of the increase in temperature of the temperature sensitive portion 34b by changing the material of the spacer 65.

According to the present invention, even if the temperature of the cooling water of the engine increases quickly, it is possible to slowly increase the temperature of the temperature sensitive portion of the wax valve in correspondence with the progress of engine warm-up, and stable engine warm-up can be obtained. In addition, since a double seal construction using a pair of O rings is adopted between the water cooling chamber and the reduced diameter bore, it is possible to completely prevent the cooling water from leaking into the reduced diameter bore.

While the invention has been described with reference to specific embodiments chosen for purposes of illustration, it should be apparent that numerous modifications could be made thereto by those skilled in the art without departing from the basic concept and scope of the invention.

We claim:

1. A device for controlling the operation of a carburetor, comprising:

a housing having an axially extending bore therein;

a wax valve fitted into said bore and extending in the axial direction of said bore, said wax valve having a temperature sensitive portion at one end thereof and having a central flange portion which has an outer diameter larger than that of said temperature sensitive portion;

a cup-shaped wax valve holder fitted into said bore so as to surround said temperature sensitive portion, said wax valve holder being spaced from said temperature sensitive portion for forming a heat insulating space therebetween, and having a thickened portion at one end thereof which is located adjacent to the flange portion of said wax valve, said thickened portion having an outer diameter which is slightly smaller than the inner diameter of said bore, said thickened portion having an outer circumferential wall which is spaced from an inner circumferential wall of said bore, and a seal ring inserted between the outer circumferential wall of said thickened portion and the inner circumferential wall of said bore; and a cooling water passage formed in said bore and surrounding said wax valve holder.

2. A device according to claim 1, wherein the flange portion of said wax valve has an outer diameter which is slightly smaller than the inner diameter of said bore, said flange portion having an outer circumferential wall which is spaced from an inner circumferential wall of said bore, and a seal ring inserted between the outer circumferential wall of said flange portion and the inner circumferential wall of said bore.

3. A device according to claim 1, further comprising a plug screwed into said bore and pressing said wax valve holder onto said wax valve, said cooling water passage being formed between said plug and said wax valve holder.

4. A device according to claim 1, wherein said wax valve holder has an inner end face at a position furthest from the flange portion of said wax valve and an inner circumferential wall extending from the periphery of said inner end face toward the flange portion of said wax valve and spaced from said temperature sensitive portion, said wax valve holder further having an annular projection which is formed on the periphery of said inner end wall and contacts said temperature sensitive portion.

5. A device according to claim 4, wherein said annular projection has an annular groove formed thereon for receiving a peripheral edge of an end face of said temperature sensitive portion.

6. A device according to claim 1, wherein said wax valve holder has an end face at the one end thereof nearest to the flange portion of said wax valve, said end face being in contact with the flange portion of said wax valve, said wax valve holder having an inner circumferential wall the entirety of which is spaced from said temperature sensitive portion.

7. A device according to claim 1, wherein said wax valve holder has an inner end face at a position furthest from the flange portion of said wax valve and an inner circumferential wall extending from the periphery of said inner end face toward the flange portion of said wax valve and spaced from said temperature sensitive portion, and an annular spacer inserted between said temperature sensitive portion and the periphery of said inner end face.

8. A device according to claim 7, wherein said spacer is made of a material having a low thermal conductivity.

9. A device according to claim 7, wherein said wax valve holder has an annular projection formed on the periphery of said inner end face, said spacer being inserted between said temperature sensitive portion and said projection.

10. A device according to claim 1, and a carburetor which comprises an intake passage, a throttle valve arranged in said intake passage, a float chamber, a fuel passage connecting said float chamber to said intake passage, and an air bleed passage connected to said fuel passage and having an air inlet which is open to said bore, said device further comprising a push rod slidably inserted into said bore and actuated by said wax valve, said push rod being operatively connected to said throttle valve and cooperating with the air inlet of said air bleed passage for controlling the degree of opening of said throttle valve and the amount of air fed into said fuel passage from said air bleed passage.

11. A device for controlling the operation of a carburetor, comprising:

a housing having an axially extending bore therein;

a wax valve fitted into said bore and extending in the axial direction of said bore, said wax valve having a temperature sensitive portion at one end thereof and having a central flange portion which has an outer diameter larger than that of said temperature sensitive portion;

a cup-shaped wax valve holder fitted into said bore so as to surround said temperature sensitive portion, said wax valve holder being spaced from said temperature sensitive portion for forming a heat insulating space therebetween, and having an inner end face at a position furthest from the flange portion of said wax valve and an inner circumferential wall extending from the periphery of said inner end face toward the flange portion of said wax valve and spaced from said temperature sensitive portion, said wax valve holder further having an annular projection which is formed on the periphery of said inner end wall and contacts said temperature sensitive portion; and a cooling water passage formed in said bore and surrounding said wax valve holder.

12. A device according to claim 11, wherein said annular projection has an annular groove formed thereon for receiving a peripheral edge of an end face of said temperature sensitive portion.

13. A device according to claim 11, wherein the flange portion of said wax valve has an outer diameter which is slightly smaller than the inner diameter of said bore, said flange portion having an outer circumferential wall which is spaced from an inner circumferential wall of said bore, and a seal ring inserted between the outer circumferential wall of said flange portion and the inner circumferential wall of said bore.

14. A device according to claim 11, further comprising a plug screwed into said bore and pressing said wax valve holder onto said wax valve, said cooling water passage being formed between said plug and said wax valve holder.

15. A device according to claim 11 and a carburetor which comprises an intake passage, a throttle valve arranged in said intake passage, a float chamber, a fuel passage connecting said float chamber to said intake passage, and an air bleed passage connected to said fuel passage and having an air inlet which is open to said bore, said device further comprising a push rod slidably inserted into said bore and actuated by said wax valve, said push rod being operatively connected to said throttle valve and cooperating with the air inlet of said air bleed passage for controlling the degree of opening of said throttle valve and the amount of air fed into said fuel passage from said air bleed passage.

16. A device for controlling the operation of a carburetor, comprising:
   a housing having an axially extending bore therein;
   a wax valve fitted into said bore and extending in the axial direction of said bore, said wax valve having a temperature sensitive portion at one end thereof and having a central flange portion which has an outer diameter larger than that of said temperature sensitive portion;
   a cup-shaped wax valve holder fitted into said bore so as to surround said temperature sensitive portion, said wax valve holder being spaced from said temperature sensitive portion for forming a heat insulating space therebetween, and having an inner end face at a position furthest from the flange portion of said wax valve and an inner circumferential wall extending from the periphery of said inner end face toward the flange portion of said wax valve and spaced from said temperature sensitive portion, an annular projection formed on the periphery of said inner end face, and an annular spacer inserted between said temperature sensitive portion and said projection; and
   a cooling water passage formed in said bore and surrounding said wax valve holder.

17. A device according to claim 16, wherein said spacer is made of a material having a low thermal conductivity.

18. A device according to claim 16, wherein the flange portion of said wax valve has an outer diameter which is slightly smaller than the inner diameter of said bore, said flange portion having an outer circumferential wall which is spaced from an inner circumferential wall of said bore, and a seal ring inserted between the outer circumferential wall of said flange portion and the inner circumferential wall of said bore.

19. A device according to claim 16, further comprising a plug screwed into said bore and pressing said wax valve holder onto said wax valve, said cooling water passage being formed between said plug and said wax valve holder.

20. A device according to claim 16 and a carburetor which comprises an intake passage, a throttle valve arranged in said intake passage, a float chamber, a fuel passage connecting said float chamber to said intake passage, and an air bleed passage connected to said fuel passage and having an air inlet which is open to said bore, said device further comprising a push rod slidably inserted into said bore and actuated by said wax valve, said push rod being operatively connected to said throttle valve and cooperating with the air inlet of said air bleed passage for controlling the degree of opening of said throttle valve and the amount of air fed into said fuel passage from said air bleed passage.

* * * * *